(12) United States Patent
Björkman et al.

(10) Patent No.: US 11,073,217 B2
(45) Date of Patent: Jul. 27, 2021

(54) SEALING VALVE ARRANGEMENT

(71) Applicant: HUSQVARNA AB, Huskvarna (SE)

(72) Inventors: Peter Björkman, Nässjö (SE); Adis Nistovic, Bankeryd (SE)

(73) Assignee: HUSQVARNA AB, Huskvarna (SE)

(*) Notice: Subject to any disclaimer, the term of this patent is extended or adjusted under 35 U.S.C. 154(b) by 22 days.

(21) Appl. No.: 16/092,979

(22) PCT Filed: Apr. 11, 2017

(86) PCT No.: PCT/EP2017/058675
§ 371 (c)(1),
(2) Date: Oct. 11, 2018

(87) PCT Pub. No.: WO2017/182330
PCT Pub. Date: Oct. 26, 2017

(65) Prior Publication Data
US 2019/0136992 A1 May 9, 2019

(30) Foreign Application Priority Data
Apr. 18, 2016 (SE) .................... 1650514-1

(51) Int. Cl.
*F16K 15/14* (2006.01)
*F16K 24/04* (2006.01)
*B60K 15/035* (2006.01)

(52) U.S. Cl.
CPC .......... *F16K 15/148* (2013.01); *B60K 15/035* (2013.01); *F16K 24/04* (2013.01); *B60K 2015/03585* (2013.01)

(58) Field of Classification Search
CPC .... F16K 15/148; F16K 15/185; F16K 15/036; F16K 15/038; F16K 15/14; F16K 15/16;
(Continued)

(56) References Cited

U.S. PATENT DOCUMENTS 3,954,121 A * 5/1976 Kardos ................ F16K 15/141
137/854
4,100,894 A 7/1978 Tamura
(Continued)

FOREIGN PATENT DOCUMENTS

CH 640327 A5 * 12/1983 ........... F16K 15/148
DE 1119351 B * 12/1961 .............. H01M 2/12
(Continued)

OTHER PUBLICATIONS

"Umbrella Valves, Belleville Valves, How they work!(Patent Pending)," retrieved from Internet URL: http://www.minivalve.com/newsite/index.php/en/by-type/umbrella-valves/how-they-work, on Dec. 24, 2015, pp. 2.
(Continued)

*Primary Examiner* — Hailey K. Do
(74) *Attorney, Agent, or Firm* — Burr & Forman, LLP

(57) ABSTRACT

Herein a sealing valve arrangement (2) for a fluid container is disclosed. The sealing valve arrangement (2) comprising a valve body (4), a flexible sealing valve (8), and a supporting element (14). The flexible sealing valve (8) comprises a sealing surface (10) and is situated in the second longitudinal portion (17) between an intermediate surface (18) and the supporting element (14). A centrally arranged recess (12) of the flexible sealing valve (8) forms a blind hole and the sealing surface (10) abuts against the intermediate surface (18), such that the flexible sealing valve (8) enables a fluid flow thought the through hole (6) only in a direction from the first longitudinal portion (15) to the second longitudinal portion (17) and the channel (16). Further a fuel tank for a hand-held power tool comprising a sealing valve arrangement is disclosed.

20 Claims, 4 Drawing Sheets

(58) Field of Classification Search
CPC ...... F16K 15/202; F16K 15/141; F16K 24/02; F16K 24/06; F16K 27/0209; B60K 15/035; B60K 15/03519; B60K 2015/03585; Y10T 137/784; Y10T 137/7879; Y10T 137/789

See application file for complete search history.

(56) References Cited

U.S. PATENT DOCUMENTS

| | | | |
|---|---|---|---|
| 4,499,916 A * | 2/1985 | Hanson | F02P 5/103 137/103 |
| 4,696,409 A | 9/1987 | Vize | |
| 4,756,982 A * | 7/1988 | McCartney, Jr. | F16K 15/148 137/512.4 |
| 4,922,954 A | 5/1990 | Blomquist et al. | |
| 5,526,843 A | 6/1996 | Wolf et al. | |
| 6,089,271 A | 7/2000 | Tani | |
| 6,116,271 A * | 9/2000 | Nickel | F16K 24/06 137/508 |
| 6,562,517 B1 * | 5/2003 | Misra | H01M 2/1205 429/225 |
| 6,729,345 B2 | 5/2004 | Bauer | |
| 8,240,292 B1 | 8/2012 | Roche et al. | |
| 2002/0096214 A1 | 7/2002 | Bauer | |
| 2008/0185062 A1 | 8/2008 | Nijland | |
| 2012/0177962 A1 * | 7/2012 | Streuer | H01M 2/1229 429/89 |
| 2016/0126517 A1 * | 5/2016 | Koch | H01M 2/1229 137/511 |

FOREIGN PATENT DOCUMENTS

| | | | | |
|---|---|---|---|---|
| DE | 10 2004 053214 A1 | 1/2006 | | |
| EP | 1 231 421 B1 | 8/2005 | | |
| EP | 1 953 432 A2 | 8/2008 | | |
| GB | 1320103 A * | 6/1973 | ........... | F16K 15/148 |
| WO | WO-02061287 A1 * | 8/2002 | ........... | F16K 15/148 |
| WO | WO-2014195466 A1 * | 12/2014 | ........... | H01M 2/1205 |

OTHER PUBLICATIONS

International Search Report and Written Opinion for International Application No. PCT/EP2017/058675 dated Jun. 22, 2017.
International Preliminary Report on Patentability for International Application No. PCT/EP2017/058675 dated Oct. 23, 2018.

* cited by examiner

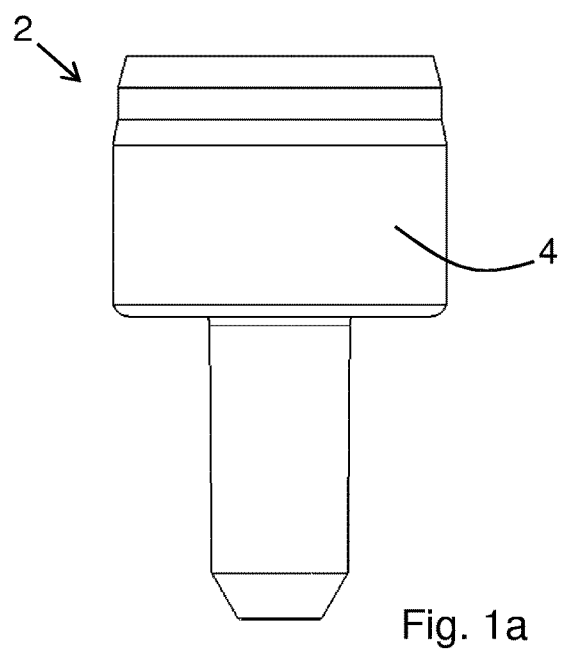
Fig. 1a
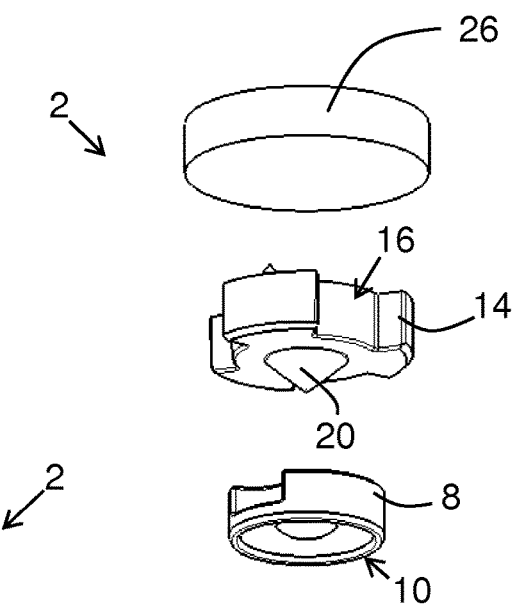
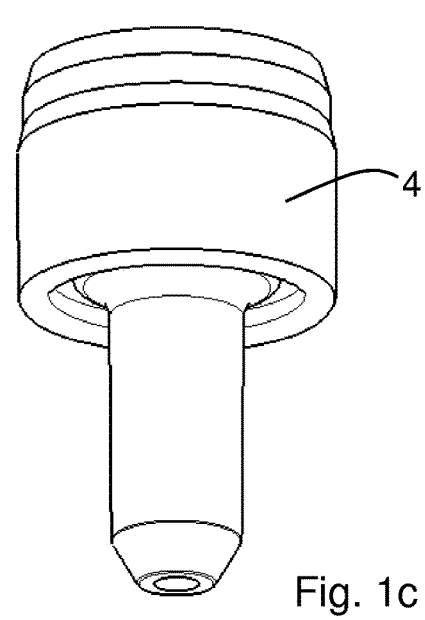
Fig. 1b
Fig. 1c

SEALING VALVE ARRANGEMENT

TECHNICAL FIELD

The present invention relates to a sealing valve arrangement.

BACKGROUND

A sealing valve arrangement may be utilised in a fluid container for equalising pressure inside the fluid container with ambient pressure outside the fluid container. The fluid container may for instance be a fuel tank.

US 2002/0096214 A1 discloses a sealing valve arrangement for a container containing a fluid. A supporting element comprising a control channel in a border region of the supporting element and a securing element comprising a passage channel are disposed on top of one another over the fluid storage of the container. A sealing valve having smaller radial dimensions than these elements and a valve channel for connecting the control channel and the passage channel are provided between the supporting element and the securing element. The sealing valve comprises a first sealing surface for sealing the passage channel from the control channel and a second sealing surface for sealing the valve channel from the control channel. The sealing valve operates in case of pressure above atmospheric, as well as sub-atmospheric pressure, within the fluid storage.

U.S. Pat. No. 4,922,954 discloses a bi-directional vent for a fuel tank utilising a resilient sealing member which in its unflexed state is a simple resilient washer. The sealing member is disposed inside a vent body, and forms both an inner and outer seal. The inner seal is formed between an inner circumferential edge on a central hole in the washer and a conical sealing surface attached to the vent body. The outer seal is formed between an outer annular sealing surface on the washer and a circumferential edge formed on a central opening in the vent body. Increased pressure in the tank causes the sealing member to deflect at its inner portion away from the circumferential edge on the vent body, resulting in outward venting. Reduced pressure in the tank causes the outer part of the sealing member to deflect away from the conical seating surface, resulting in inward venting.

A two way sealing valve provided for venting a fluid container, such as e.g. a fuel tank, may under certain unfavourable conditions let fluid, e.g. fuel, out of the fluid container.

SUMMARY

It is an object of the present invention to provide an alternative sealing valve arrangement for a fluid container.

According to an aspect of the invention, the object is achieved by a sealing valve arrangement for a fluid container. The sealing valve arrangement comprises a valve body, a flexible sealing valve, and a supporting element. The valve body comprises a through hole, the through hole comprising a first longitudinal portion having a first diameter and a second longitudinal portion having a second diameter, the first diameter being smaller than the second diameter, wherein an intermediate surface extends between the first and second longitudinal portions. The flexible sealing valve comprises a sealing surface and a centrally arranged recess and is situated in the second longitudinal portion between the intermediate surface and the supporting element. The supporting element comprises a centrally arranged protrusion abutting against the flexible sealing valve at least partially extending into the centrally arranged recess to press the sealing surface against the intermediate surface for sealing the second longitudinal portion from the first longitudinal portion. The supporting element comprises a channel, the channel forming together with the through hole part of a passage through the sealing valve arrangement. The centrally arranged recess forms a blind hole and the sealing surface abuts against the intermediate surface, such that the flexible sealing valve enables a fluid flow thought the through hole only in a direction from the first longitudinal portion to the second longitudinal portion and the channel.

Since the centrally arranged recess forms a blind hole and the sealing surface abuts against the intermediate surface, such that the flexible sealing valve enables a fluid flow thought the through hole only in a direction from the first longitudinal portion to the second longitudinal portion and the channel, a one way sealing valve arrangement is provided. As a result, the above mentioned object is achieved.

The sealing valve arrangement may be configured for arrangement in a fluid container. The valve body may be configured to be arranged in a fluid container such that the passage through the sealing valve arrangement connects an ambient environment of the fluid container with an inside of the fluid container. The sealing valve arrangement may be arranged in a fluid container such that ambient air is admitted through the sealing valve arrangement into the container under conditions when there prevails a sub-atmospheric pressure inside the container. The channel may form part of the through hole, or the channel may connect at both ends thereof to the through hole. The second longitudinal portion of the through hole may be fluidly connected to the channel.

An advantage of providing a one way sealing valve may be that possible future authority demands relating to a permeability demand on a fuel tank including a fuel tank vent may be fulfilled. A sealing valve arrangement according to the present invention arranged as a fuel tank vent in a fluid container forming a fuel tank would fulfil such future authority demand and is easier and less expensive to manufacture than two way sealing valve.

According to embodiments, the supporting element may be arranged in the through hole. In this manner the supporting element may form a separate member, which is positioned in the through hole to abut with its centrally arranged protrusion against the flexible sealing valve.

According to embodiments, the valve body may comprise a first body portion and a second body portion. The supporting element may form an integral part of the second body portion. In this manner the supporting element is positioned with its centrally arranged protrusion against the flexible sealing valve when the first and second body portions of the valve body are joined.

It is a further object of the present invention to provide a fuel tank for a hand-held power tool wherein a risk of fuel leakage is reduced.

According to an aspect of the invention the object is achieved by a fuel tank for a hand-held power tool comprising a fluid container, the fluid container comprising at least one wall member configured to delimit an ambient environment of the fluid container from an inside of the fluid container. A sealing valve arrangement according to any aspect and/or embodiment disclosed herein is arranged in the at least one wall member such that a sub-atmospheric pressure inside the fluid container is equalised via the sealing valve arrangement.

Since the sealing valve arrangement is arranged in the at least one wall member such that a sub-atmospheric pressure inside the fluid container is equalised via the sealing valve arrangement, and the sealing valve arrangement thus forms a one-way valve, ventilation of the fuel tank is achieved while fuel inside the fuel tank is prevented from leaking through the sealing valve arrangement to an ambient environment of the fuel tank. Thus the above mentioned object is achieved.

A sub-atmospheric pressure inside the fuel tank, which may be caused by a combustion engine drawing fuel from the fuel tank, may be avoided and reliable supply of fuel to internal combustion engine of the hand-held power may be ensured.

It has been realised by the inventors that a pressure above atmospheric pressure inside the fuel tank not be ventilated through the sealing valve arrangement. Accordingly, the inventors have realised that the provision of a one-way valve in the fuel tank is sufficient.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which:

FIGS. 1a-1c illustrate a sealing valve arrangement according to embodiments;

DETAILED DESCRIPTION

Figure 2A:
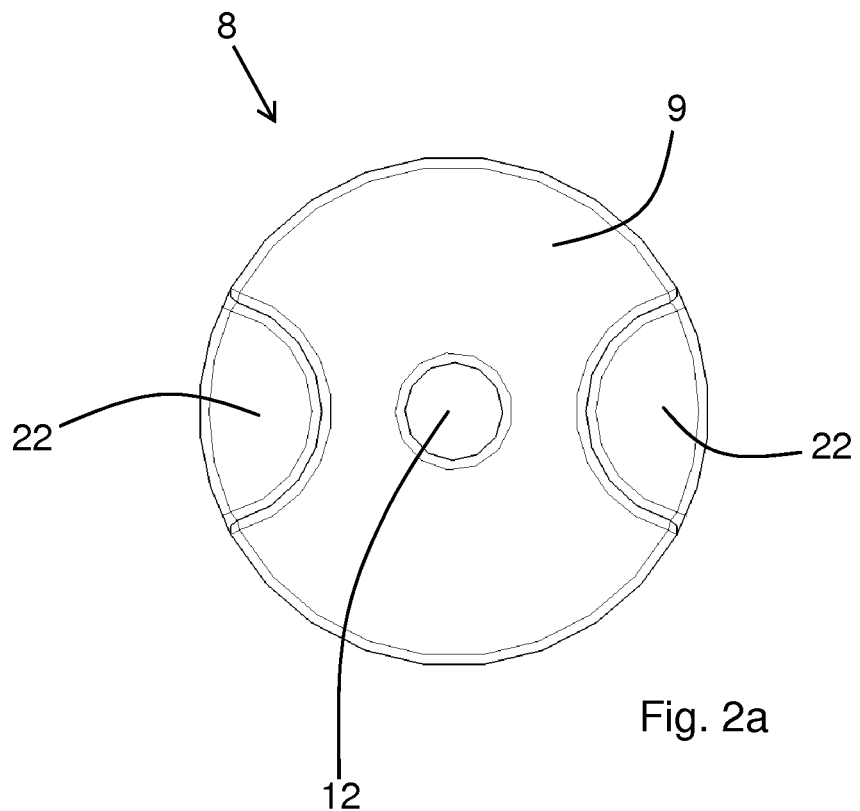
FIGS. 2a and 2b illustrate a flexible sealing valve in more detail.

Aspects of the present invention will now be described more fully. Like numbers refer to like elements throughout. Well-known functions or constructions will not necessarily be described in detail for brevity and/or clarity.

FIGS. 1a-1c illustrate a sealing valve arrangement 2 according to embodiments. In FIG. 1a a side view of the sealing valve arrangement 2 is illustrated, in FIG. 1b a cross section through the sealing valve arrangement 2 is illustrated, and in FIG. 1c an exploded view of the sealing valve arrangement 2 is illustrated. The sealing valve arrangement 2 is a sealing valve arrangement configured for use in connection with a fluid container. The sealing valve arrangement 2 comprising a valve body 4, a flexible sealing valve 8, and a supporting element 14. In these embodiments, the valve body 4, the flexible sealing valve 8, and the supporting element 14 each from separate elements, which are assembled to form the sealing valve arrangement 2.

The valve body 4 may be made from a thermoplastic material such as e.g. polyoxymethylene (POM). The valve body 4 comprises a through hole 6 extending from one end of the valve body 4 to its opposite end. As will be discussed below various elements are positioned in the through hole 4. The through hole 6 comprises a first longitudinal portion 15 having a first diameter d1 and a second longitudinal portion 17 having a second diameter d2. An intermediate surface 18 extends between the first and second longitudinal portions 15, 17. The first diameter d1 is smaller than the second diameter d2. In these embodiments the intermediate surface 18 extends in a plane extending perpendicularly to the through hole 6. In alternative embodiments, the intermediate surface may extend at an angle to the first and second longitudinal portions 15, 17, such that the intermediate surface has a frustoconical shape providing a gradual transition between the first and second longitudinal portions 15, 17.

The flexible sealing valve 8 comprises a flexible body 9, the flexible body 9 comprising a sealing surface 10 and a centrally arranged recess 12. The flexible sealing valve 8 is arranged in the second longitudinal portion 17 between the intermediate surface 18 and the supporting element 14. In these embodiments, the sealing surface 10 is substantially circular. The sealing surface 10 extends axially circularly along an axial end of the flexible sealing valve 8.

The supporting element 14 may be made from a thermoplastic material such as e.g. polyoxymethylene (POM). The supporting element 14 comprises a centrally arranged protrusion 20 abutting against the flexible sealing valve 8. The centrally arranged protrusion 20 at least partially extends into the centrally arranged recess 12 of the flexible sealing valve 8 to press the sealing surface 10 against the intermediate surface 18 for sealing the second longitudinal portion 17 from the first longitudinal portion 15. Thus, the sealing valve arrangement 2 forms a one-way valve. A pressure difference between the first and second longitudinal portions 15, 17 in the through hole 6, may be equalised if the pressure is higher in the first longitudinal portion 15 than in the second longitudinal portion 17, such that the flexible sealing valve 8 gives way.

According to embodiments the flexible sealing valve 8 may have a smaller diameter than the second diameter d2. In this manner the flexible sealing valve 8, when arranged in the second longitudinal portion 17, will not abut radially against the valve body 4. Thus, the flexible sealing valve 8 will not be impeded by any frictional forces between a radial outer periphery of the flexible sealing valve 8 and the valve body 4. Accordingly, the sealing surface 10 will abut securely against the intermediate surface 18 and the flexible sealing valve 8 will give way to an excessive pressure in the first longitudinal portion 15. Moreover, if the flexible sealing valve 8 should swell, e.g. as an effect of being subjected to fuel, the flexible sealing valve 8 having a smaller diameter than the second diameter d2 may still have room within the second longitudinal portion 17 of the through hole 6 and will not be impede in its function as explained above.

The supporting element 14 comprises a channel 16. The channel 16 forms together with the through hole 6 part of a passage through the sealing valve arrangement. The second longitudinal portion 17 of the through hole 6 is fluidly connected to the channel 16.

In these embodiments, the channel 16 is arranged at a border region of the supporting element 14, the channel being formed between the supporting element 14 and the valve body 4. Accordingly, the channel 16 forms part of the through hole 6 as the supporting element 14 is arranged in the through hole 6.

The centrally arranged recess 12 of the flexible sealing valve 8 forms a blind hole. The sealing surface 10 abuts against the intermediate surface 18. Accordingly, the flexible sealing valve 8 enables a fluid flow thought the through hole 6 only in a direction from the first longitudinal portion 15 to the second longitudinal portion 17 and the channel 16.

In these embodiments, the supporting element 14 is press fitted in the valve body 4 inside the through hole 6. In this manner it may be ensured that the supporting element 14 is securely positioned in the through hole 6. Thus, it may be ensured that the centrally arranged protrusion 20 of the supporting element 14 remains securely positioned in the centrally arranged recess 12 of the flexible sealing valve 8 and the flexile sealing valve 8 remains securely positioned abutting against the intermediate surface 18.

According to some embodiments, a first porous element 24 may be arranged in the through hole 6 on a same side of the intermediate surface 18 as the first longitudinal portion 15. In this manner particles from an ambient environment of the sealing valve arrangement 2 and a container, in which the sealing valve arrangement 2 is arranged, may be prevented from reaching the sealing surface 10 of the flexible sealing valve 8 and the intermediate surface 18. Thus, particles will not disturb the sealing formed between the sealing surface 10 and the intermediate surface 18.

According to some embodiments, a second porous element 26 may be arranged in the through hole 6 on a same side of the intermediate surface 18 as the second longitudinal portion 17. In this manner particles inside a container, in which the sealing valve arrangement 2 is arranged, may be prevented from reaching the sealing surface 10 of the flexible sealing valve 8 and the intermediate surface 18. Thus, particles will not disturb the sealing formed between the sealing surface 10 and the intermediate surface 18.

The first and second porous elements 24, 26 may be made from a sintered porous material, such as e.g. sintered bronze or sintered stainless steel. Suitably the porous elements 24, 26 should have hydrophobic properties, i.e. repel water and moisture to prevent clogging and freezing. Hydrophobic properties may be provided choosing an adequate pore size in the porous material, such as e.g. a pore size of approximately 50 µm. Thus, capillary forces are inhibited.

Mentioned purely as an example, the sealing valve arrangement may have a length of 20 mm and an outer diameter of 10 mm at its wider end and an outer diameter of 4 mm at is narrow end. The first diameter, d1, may be approximately 4 mm and the second diameter, d2, may be approximately 6 mm. The flexible sealing valve 8 may have a diameter of approximately 5 mm, thus, having a clearing distance in a radial direction within the through hole 6 at the second diameter, d2, of approximately 0.5 mm. A flexible tube may be connected to the narrow end of the sealing valve arrangement 2. In operation, the wider end may be fastened in a wall member of a container and the narrow end may extend at an outside of the container. The flexible sealing valve 8 may permit a maximum pressure difference between the first and second longitudinal portions 15, 17 in the through hole 6 of 70 mbar before the flexible sealing valve 8 gives way and equalises the pressure, at east to some extent.

Figure 2B:
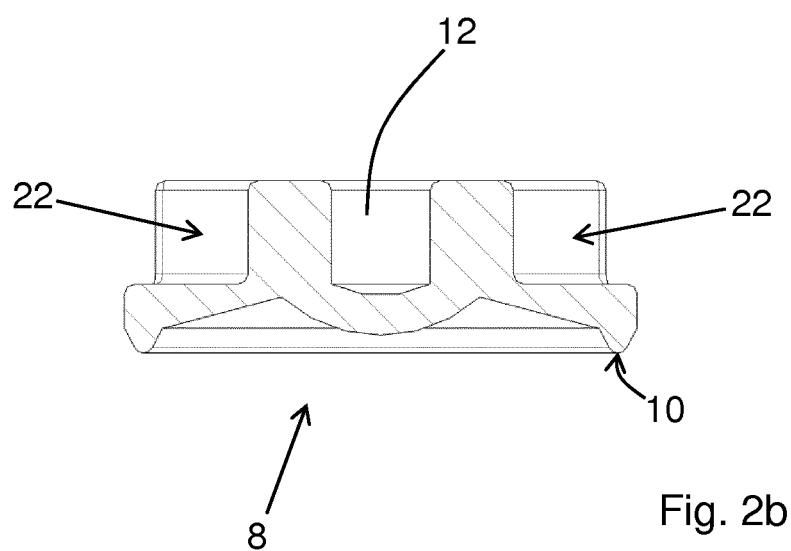

FIGS. 2a and 2b illustrate the flexible sealing valve 8 of FIGS. 1a and 1s in more detail. FIG. 2a illustrates a top view and FIG. 2b illustrates a cross section through, the flexible sealing valve 8. According to these embodiments, the flexible sealing valve 8 may comprise a flexible body 9 being provided with at least one peripheral recess 22 opposite to the sealing surface 10, the at least one peripheral recess 22 defining an area of weakness in the flexible body 9 to allow the flexible body 9 to flex, such that when a pressure in the first longitudinal portion 15 is greater than a pressure in the second longitudinal portion 17, the valve body 9 valve will flex to form a gap adjacent the intermediate surface 18, and when a pressure is greater in the second longitudinal portion 17 than a pressure in the first longitudinal portion 15, the sealing surface 10 will seal against the intermediate surface 18 and will seal the second longitudinal portion 17 from the first longitudinal portion 15.

The flexible sealing valve 8 may be made from a rubber material such as e.g. a flour silicone rubber material. The rubber material should be fuel resistant, should not swell, and shud maintain its flexibility over time. A hardness of the rubber material within a range of 30-50 Shore A (DIN 53 505) may be suitable.

Figure 3A:
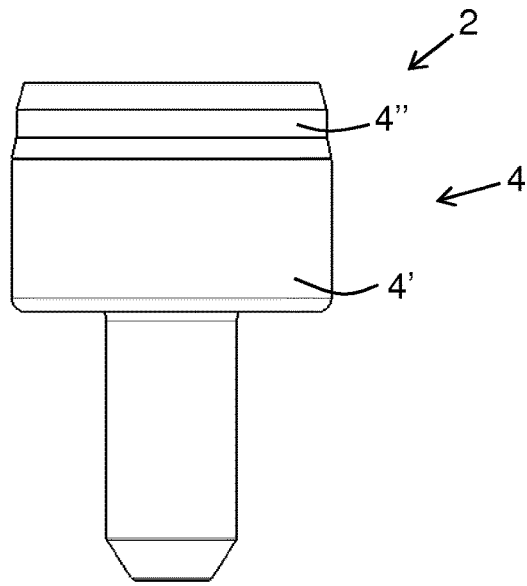
FIGS. 3a-3c illustrate a sealing valve arrangement according to alternative embodiments.
Figure 3B:
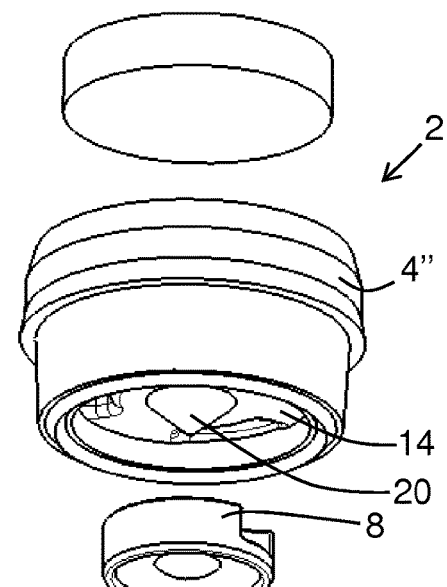
Figure 3B:
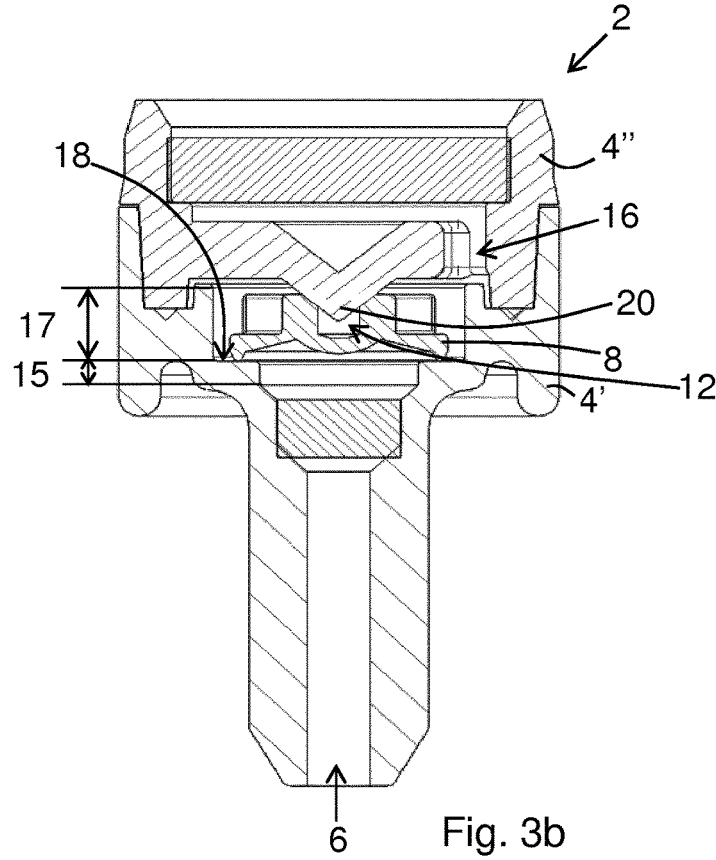
Figure 3C:
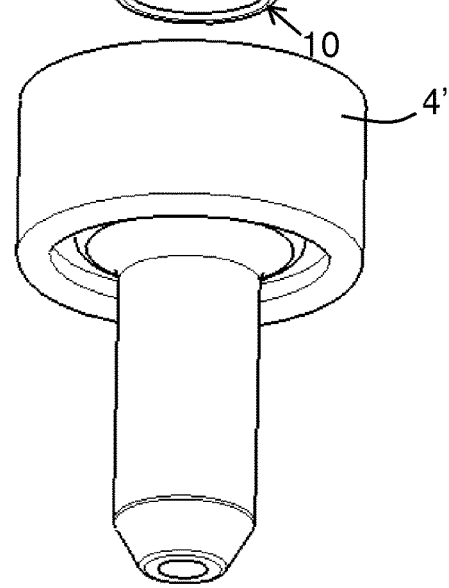

FIGS. 3a-3c illustrate a sealing valve arrangement 2 according to alternative embodiments. In FIG. 3a a side view of the sealing valve arrangement 2 is illustrated, in FIG. 3b a cross section through the sealing valve arrangement 2 is illustrated, and in FIG. 3c an exploded view of the sealing valve arrangement 2 is illustrated. These embodiments resemble in much the embodiments of FIGS. 1a-1c. Accordingly, in the following the main differences of the embodiments FIGS. 3a-3c compared to the embodiment of FIGS. 1a-1c will be discussed.

Again, the sealing valve arrangement 2 comprises a valve body 4, a flexible sealing valve 8, and a supporting element 14. A sealing surface 10 of the flexible sealing valve 8 abuts against an inter mediate surface 18 between a first longitudinal portion 15 and a second longitudinal portion 17 of a through hole 6 extending through the valve body 4.

In these embodiments, the valve body 4 comprises a first body portion 4' and a second body portion 4". The supporting element 14 forms an integral part of the second body portion 4". That is, the supporting element 14 is manufactured in one piece with the second body portion 4".

Again, the supporting element 14 comprises a central protrusion 20, and the flexible sealing valve 8 comprises a centrally arranged recess 12 forming a blind hole. When the sealing valve arrangement 2 is assembled, the supporting element 14 with its centrally arranged protrusion 20 abuts against the flexible sealing valve 8 in the centrally arranged recess 12. The first and second body portions 4', 4" of the valve body are joined after the flexible sealing valve 8 has been positioned against the intermediate surface 18.

The first and second body portions 4', 4" may be joined in any suitable manner such as by gluing, microwave welding, ultrasonic welding, or friction welding. An advantage with these embodiments wherein the first and second body portions 4', 4" are joined such as by gluing, microwave welding, ultrasonic welding, or friction welding is that the sealing valve arrangement 2 may be resistant to vibrations and shock to a larger extent than the previous embodiments wherein the supporting element 14 is press fitted into the valve body 4.

Again, the supporting element 14 comprises a channel 16. The channel 16 forms together with the through hole 6 part of a passage through the sealing valve arrangement 2. In these embodiments, the channel 16 connects at both ends thereof to the through hole 6.

Figure 4:
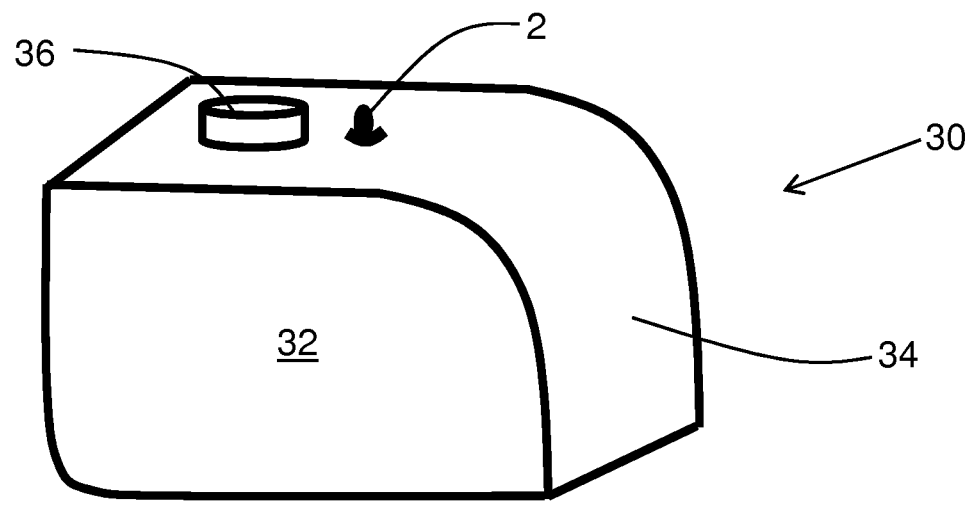
FIG. 4 illustrates a fuel tank according to embodiments.

FIG. 4 illustrates a fuel tank 30 according to embodiments. The fuel tank 30 is a fuel tank of a hand-held power tool such as e.g. a chain saw, a cutting tool, a hedge trimmer, a grass trimmer, etc.

The fuel tank 30 comprises a sealing valve arrangement 2 according to aspects and/or embodiments disclosed herein. The fuel tank 30 comprises a fluid container 32 and has a lid 36 for refilling. The fluid container 32 comprising at least one wall member 34 configured to delimit an ambient environment of the fluid container 32 from an inside of the fluid container 32. A sealing valve arrangement 2 according to any aspect and/or embodiment disclosed herein is arranged in the at least one wall member 34. Thus, the fuel tank 30 is ventilated via the sealing valve arrangement 2. Due to the sealing valve arrangement 2 a sub-atmospheric pressure inside the fuel tank 30 may be equalised via the sealing valve arrangement 2. Due to the construction of the sealing valve arrangement 2 forming a means for equalising the pressure there is no risk, or at least very low risk that fuel will leakage out of the fuel tank 30 via the sealing valve arrangement 2.

The fluid container 32 of the fuel tank 30 may have a volume within a range of 0.5-2 litres, or within a range of 1-2 litres. The fluid container 32 may be manufactured e.g. from a material comprising polyamide, glass fibres, and an impact resistance modifier. The sealing valve arrangement 2 may be arranged to open and admit ambient air into the fuel tank 30 to limit a pressure difference at a maximum of 70 mbar within the fluid container 32.

Figure 5:
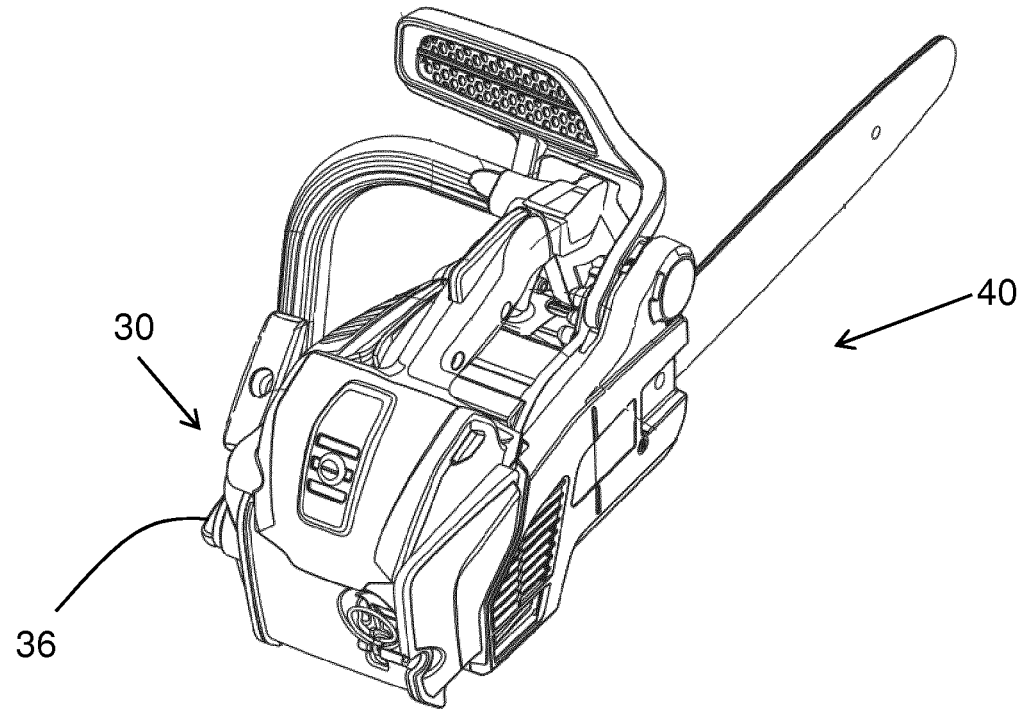
FIG. 5 illustrates a hand-held power tool according to embodiments.

FIG. 5 illustrates a hand-held power tool 40 according to embodiments. In these embodiments the hand-held power tool is a chain saw. The hand-held power tool 40 may be any other type of hand-held power tool such as e.g. a cutting tool, a hedge trimmer, a grass trimmer, a blower, etc. The term hand-held power tool also encompasses power tools which may be supported by an operator in other ways than carrying the entire weight of the power tool with his or her hands, such as supporting the weight of the power tool on the shoulders or the back of the operator. The latter type of power tool is hand-held in the sense that it is guided by one or both hands of the operator.

The hand held power tool 40 comprises a fuel tank 30 according to aspects and/or embodiments discussed herein. In particular, the fuel tank 30 comprises a sealing valve arrangement according to aspects and/or embodiments discussed herein. The fuel tank 30 may be at least partially enclosed within a housing of the hand-held power tool 40. A lid 36 of the fuel tank 30 is visible at a left-hand side of the hand-held power tool 40 in FIG. 5.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A sealing valve arrangement for a fluid container, the sealing valve arrangement comprising:
    a valve body;
    a flexible sealing valve; and
    a supporting element;
    wherein the valve body comprises a through hole, the through hole comprising a first longitudinal portion having a first diameter and a second longitudinal portion having a second diameter, the first diameter being smaller than the second diameter, wherein an intermediate surface extends between the first and second longitudinal portions;
    wherein the flexible sealing valve comprises a flexible body, a sealing surface, and a centrally arranged recess and is situated in the second longitudinal portion between the intermediate surface and the supporting element, the flexible body having a first side and a second side disposed opposite the first side, the sealing surface being disposed on the first side of the flexible body;
    wherein the supporting element comprises a centrally arranged protrusion abutting against the flexible sealing valve at least partially extending into the centrally arranged recess to press the sealing surface against the intermediate surface for sealing the second longitudinal portion from the first longitudinal portion;
    wherein the supporting element comprises a channel, the channel and the through hole forming part of a passage through the sealing valve arrangement;
    wherein the centrally arranged recess forms a blind hole and the sealing surface abuts against the intermediate surface, such that the flexible sealing valve enables a fluid flow through the through hole only in a direction from the first longitudinal portion to the second longitudinal portion and the channel;
    wherein the flexible body comprises a first peripheral recess disposed on the second side of the flexible body, the first peripheral recess being formed by a first curved wall that defines a first weakened area of the flexible body that permits flexing of the sealing surface at the first peripheral recess to relieve a pressure difference;
    wherein the flexible body comprises a second peripheral recess disposed on the second side of the flexible body, the second peripheral recess being formed by a second curved wall that defines a second weakened area of the flexible body that permits flexing of the sealing surface at the second peripheral recess to relieve a pressure difference; and
    wherein the supporting element is disposed between a first porous element and the flexible sealing valve.

2. The sealing valve arrangement according to claim 1, wherein valve body comprises a first body portion and a second body portion, and wherein the supporting element forms an integral part of the second body portion.

3. The sealing valve arrangement according to claim 1, wherein the first peripheral recess and the second peripheral recess define respective areas of weakness in the flexible body to allow the flexible body to flex, such that when a pressure in the first longitudinal portion is greater than a pressure in the second longitudinal portion, the flexible body will flex to form a gap adjacent the intermediate surface, and when a pressure is greater in the second longitudinal portion than a pressure in the first longitudinal portion, the sealing surface will seal against the intermediate surface and will seal the second longitudinal portion from the first longitudinal portion.

4. The sealing valve arrangement according to claim 1, wherein the flexible sealing valve has a smaller diameter than the second diameter.

5. The sealing valve arrangement according to claim 1, wherein the first porous element is arranged in the through hole on a same side of the intermediate surface as the second longitudinal portion.

6. The sealing valve arrangement according to claim 1, wherein the sealing surface is substantially circular.

7. The sealing valve arrangement according to claim 1, wherein the intermediate surface extends in a plane extending perpendicularly to the through hole.

8. The sealing valve arrangement according to claim 1, wherein the valve body comprises an elongate extension that extends centrally from the first longitudinal portion; and
    wherein a diameter of the through hole in the elongate extension is less than the first diameter.

9. The sealing valve arrangement according to claim 1, wherein a second porous element is arranged in the through hole on a same side of the intermediate surface as the first longitudinal portion.

10. The sealing valve arrangement according to claim 9, wherein a diameter of the second porous element is less than the first diameter.

11. A fuel tank for a hand-held power tool comprising a fluid container, the fluid container comprising at least one wall member configured to delimit an ambient environment of the fluid container from an inside of the fluid container;
wherein the fuel tank further comprises the sealing valve arrangement according to claim 1, wherein the sealing valve arrangement is arranged in the at least one wall member such that sub-atmospheric pressure inside the fluid container is equalized via the sealing valve arrangement.

12. A hand-held power tool comprising the fuel tank according to claim 11.

13. The sealing valve arrangement according to claim 1, wherein the supporting element is arranged in the through hole.

14. The sealing valve arrangement according to claim 13, wherein the supporting element is press fitted in the valve body inside the through hole.

15. The sealing valve arrangement according to claim 13, wherein the channel is arranged at a border region of the supporting element, the channel being formed between the supporting element and the valve body.

16. A sealing valve arrangement for a fluid container, the sealing valve arrangement comprising:
a valve body;
a flexible sealing valve; and
a supporting element;
wherein the valve body comprises a through hole, the through hole comprising a first longitudinal portion having a first diameter and a second longitudinal portion having a second diameter, the first diameter being smaller than the second diameter, wherein an intermediate surface extends between the first and second longitudinal portions;
wherein the flexible sealing valve comprises a flexible body, a sealing surface, and a centrally arranged recess and is situated in the second longitudinal portion between the intermediate surface and the supporting element, the flexible body having a first side and a second side disposed opposite the first side, the sealing surface being disposed on the first side of the flexible body;
wherein the supporting element comprises a centrally arranged protrusion abutting against the flexible sealing valve at least partially extending into the centrally arranged recess to press the sealing surface against the intermediate surface for sealing the second longitudinal portion from the first longitudinal portion,
wherein the supporting element comprises a channel, the channel and the through hole forming part of a passage through the sealing valve arrangement;
wherein the centrally arranged recess forms a blind hole and the sealing surface abuts against the intermediate surface, such that the flexible sealing valve enables a fluid flow through the through hole only in a direction from the first longitudinal portion to the second longitudinal portion and the channel,
wherein the flexible body comprises a first peripheral recess disposed on the second side of the flexible body, the first peripheral recess being formed by a first curved wall that defines a first weakened area of the flexible body that permits flexing of the sealing surface at the first peripheral recess to relieve a pressure difference;
wherein the flexible body comprises a second peripheral recess disposed on the second side of the flexible body, the second peripheral recess being formed by a second curved wall that defines a second weakened area of the flexible body that permits flexing of the sealing surface at the second peripheral recess to relieve a pressure difference,
wherein the supporting element is disposed between a first porous element and the flexible sealing valve;
wherein a center of the centrally arranged recess defines a central axis of the flexible body; and
wherein the flexible body is bilaterally symmetric about plane that passes through the center axis of the flexible body.

17. The flexible sealing valve according to claim 16, wherein the first peripheral recess and the second peripheral recess define respective areas of weakness in the flexible body to allow the flexible body to flex.

18. The flexible sealing valve according to claim 16, wherein a thickness of the flexible body at the first peripheral recess is less than a thickness of the flexible body adjacent to first peripheral recess, and wherein a thickness of the flexible body at the second peripheral recess is less than a thickness of the flexible body adjacent to second peripheral recess.

19. A sealing valve arrangement for a fluid container, the sealing valve arrangement comprising:
a valve body;
a flexible sealing valve; and
a supporting element;
wherein the valve body comprises a through hole, the through hole comprising a first longitudinal portion having a first diameter and a second longitudinal portion having a second diameter, the first diameter being smaller than the second diameter, wherein an intermediate surface extends between the first and second longitudinal portions;
wherein the flexible sealing valve comprises a flexible body, a sealing surface, and a centrally arranged recess and is situated in the second longitudinal portion between the intermediate surface and the supporting element, the flexible body having a first side and a second side disposed opposite the first side, the sealing surface being disposed on the first side of the flexible body;
wherein the supporting element comprises a centrally arranged protrusion abutting against the flexible sealing valve at least partially extending into the centrally arranged recess to press the sealing surface against the intermediate surface for sealing the second longitudinal portion from the first longitudinal portion;
wherein the supporting element comprises a channel, the channel and the through hole forming part of a passage through the sealing valve arrangement;
wherein the centrally arranged recess forms a blind hole and the sealing surface abuts against the intermediate surface, such that the flexible sealing valve enables a fluid flow through the through hole only in a direction from the first longitudinal portion to the second longitudinal portion and the channel;
wherein the flexible body comprises a first peripheral recess disposed on the second side of the flexible body, the first peripheral recess being formed by a first curved wall that defines a first weakened area of the flexible body that permits flexing of the sealing surface at the first peripheral recess to relieve a pressure difference;

wherein the flexible body comprises a second peripheral recess disposed on the second side of the flexible body, the second peripheral recess being formed by a second curved wall that defines a second weakened area of the flexible body that permits flexing of the sealing surface at the second peripheral recess to relieve a pressure difference;

wherein the supporting element is disposed between a first porous element and the flexible sealing valve; and wherein the first peripheral recess is disposed on an opposite edge of the second side of the flexible body from the second peripheral recess.

20. The flexible sealing valve according to claim 19, wherein a thickness of the flexible body at the first peripheral recess is less than a thickness of the flexible body adjacent to first peripheral recess, and wherein a thickness of the flexible body at the second peripheral recess is less than a thickness of the flexible body adjacent to second peripheral recess.

\* \* \* \* \*